(12) United States Patent
Mittelstadt

(10) Patent No.: US 9,564,741 B1
(45) Date of Patent: Feb. 7, 2017

(54) ONE AXIS SHUTTER WITH A PIN-BASED BUS SYSTEM FOR MINIATURE CIRCUIT BREAKER LOAD CENTERS

(71) Applicant: SCHNEIDER ELECTRIC USA, INC., Palatine, IL (US)

(72) Inventor: Chad R. Mittelstadt, Cedar Rapids, IA (US)

(73) Assignee: Schneider Electric USA, Inc., Andover, MA (US)

( * ) Notice: Subject to any disclaimer, the term of this patent is extended or adjusted under 35 U.S.C. 154(b) by 37 days.

(21) Appl. No.: 14/802,483

(22) Filed: Jul. 17, 2015

(51) Int. Cl.
| | |
|---|---|
| *H02B 1/14* | (2006.01) |
| *H02B 1/06* | (2006.01) |
| *H01R 13/447* | (2006.01) |
| *H01H 9/22* | (2006.01) |
| *H01R 13/453* | (2006.01) |
| *H02B 1/20* | (2006.01) |

(52) U.S. Cl.
CPC *H02B 1/14* (2013.01); *H02B 1/20* (2013.01); *H01H 9/22* (2013.01); *H01R 13/447* (2013.01); *H01R 13/4538* (2013.01); *H02B 1/06* (2013.01)

(58) Field of Classification Search
CPC ..... H02B 1/06; H02B 1/14; H02B 2001/0155; H01H 9/22; H01R 13/447; H01R 13/4538
USPC ................... 361/634–636, 652–656
See application file for complete search history.

(56) References Cited

U.S. PATENT DOCUMENTS

| | | | | |
|---|---|---|---|---|
| 2,758,257 A | * | 8/1956 | Wills | H02B 1/06 248/27.1 |
| 2,871,284 A | * | 1/1959 | Wills | H02B 1/42 174/535 |
| 4,082,396 A | * | 4/1978 | Coley | H02B 1/20 206/701 |
| 4,918,258 A | | 4/1990 | Ayer | |
| 9,450,384 B2 | * | 9/2016 | Sharp | H02B 1/14 |
| 2016/0181769 A1 | * | 6/2016 | Walgenbach | H02B 1/14 248/345 |

* cited by examiner

*Primary Examiner* — Zachary M Pape
(74) *Attorney, Agent, or Firm* — Locke Lord LLP

(57) ABSTRACT

Apparatus for substantially eliminating exposure to live parts in a load center includes a bus assembly with male-terminal stabs which are capped with nonconductive material. A nonconductive structure covers the bus assembly and allows only the stabs to pass into the interior of circuit breaker compartments. A shutter assembly in each circuit breaker compartment has a nonconductive shutter plate that moves only in the Z axis to provide access to the stabs when a circuit breaker is inserted with a Z axis motion. Inserting the circuit breaker in the load center causes a shutter plate latch to open and depress the shutter. When the circuit breaker is removed from the load center, the shutter plate is biased upward and latched in a position over the stabs. No live touch points are available in the load center.

14 Claims, 7 Drawing Sheets

ONE AXIS SHUTTER WITH A PIN-BASED BUS SYSTEM FOR MINIATURE CIRCUIT BREAKER LOAD CENTERS

FIELD OF THE INVENTION

The present disclosure relates to methods and systems for inserting and removing a circuit breaker from an electrical panel or panelboard, and more particularly to a method and apparatus for reducing the chances of exposure to live parts in the panelboard.

BACKGROUND OF THE INVENTION

An electrical panel or panelboard, has a main bus and individual connection points on the bus that are connectable to electrical devices, such as circuit breakers for branch conductors and any other electrical devices designed to be installed for a branch circuit. Because the circuit breakers, sometimes referred to herein simply as 'breakers" for convenience, and other branch electrical devices are typically mounted directly to the panelboard, an operator and/or tools may come in contact with exposed conductors in the panelboard when installing or removing the circuit breakers from the panelboard. Thus, it is recommended that power be shut off to the panelboard as a precaution when electrical devices are being installed or removed. However, it may be considered desirable in some cases to keep the panelboard energized to prevent an electrical hazard as a consequence of deenergization, or operators may intentionally keep the power on in the interest of saving time. Moreover, shutting off power to the panelboard can be a major inconvenience, especially for data centers, hospitals, and other critical applications that require a high availability power source.

Thus, a need exists for an improved way to safely insert and remove a circuit breaker or other switching equipment from an electrical panel as part of a larger scheme for installing and removing branch circuit devices without deenergizing the electrical panel. Measures to prevent unintentional contact with live, i.e. energized, conductors are often known as "finger safe" provisions. Work on energized equipment will be known herein as 'live work". Particular panelboards, oftentimes called load centers, are front-accessible, wall-mounted panelboards, and typically for low voltage light, heat or power circuit applications, which have miniature circuit breakers to define and protect each branch circuit. Due to their size, design, and economic constraints, load center-type panel boards can present unique challenges for the above considerations.

SUMMARY OF THE DISCLOSED EMBODIMENTS

The embodiments disclosed herein are directed to methods and systems for reducing or eliminating the possibility of exposure to live parts in a panelboard, and particularly in the load center variety of panelboard, and safely installing and removing a circuit breaker or other branch electrical devices from the energized panelboard. While the illustrated embodiments are explained with load centers in mind, and the terms "load center" and "panelboard" may sometimes be used interchangeably herein, the present invention is not necessarily limited to the miniature circuit breaker load center environment.

The disclosed embodiments provide a shutter assembly for the panelboard that automatically closes off access to the conductors in the panelboard until a circuit breaker is inserted in the panelboard. A shutter assembly is attached in the circuit breaker mounting compartments, sometimes referred to herein as "wells," of the panelboard and serves as one part of a protective barrier for the busses of the panelboard. The circuit breaker is designed so that inserting it in the complementary panelboard in a Z-axis motion unlocks and depresses a shutter plate of the shutter assembly in a Z-axis motion and allows the circuit breaker to access the conductors in the panelboard, which also extend in the Z-axis. When the circuit breaker is removed from the panelboard, the shutter plate rises, locks and again closes off access to the conductors. Such a shutter assembly helps operators to safely insert and remove a circuit breaker or other electrical device from the panelboard while also minimizing the potential for exposure to live parts in the panelboard.

In some implementations, the shutter assembly comprises one moving part which is a perforate shutter plate with biasing towards the raised, or protective position. One or more springs at the sides of the shutter plate comprise a latching mechanism holding the shutter plate in the raised position in the absence of a circuit breaker interacting therewith. Thus the shutter assembly is robust and economical. The bus system of the panelboard is laid out to have power delivery and neutral return terminals, i.e. stabs, extended in the Z axis so that the stabs pass closely through the perforations of the shutter plate when it is depressed by an insertion of the breaker. The bus system of the load center beneath the stabs is covered with a nonconductive layer such as the bottom of a circuit breaker well structure. Each stab preferably sits beneath the top level of the shutter plate and is also capped with a nonconductive material to further prevent access to electrically live touch points. The line and neutral terminals of the complementary circuit breaker are female receptacles in the bottom of the breaker which cover and electrically connect to the bus stabs upon insertion of the breaker.

Each branch circuit breaker slot of the load center is a compartment for a circuit breaker, desirably being a well-like structure with sides that extend in the Z axis to substantially cover the depth of the breaker when inserted to further minimize access to live conductors. The load side power and neutral connections for a branch circuit are prewired into the breaker interior before insertion of the breaker into the compartment. These load side connections extend from a side panel of the breaker through a slot in the breaker compartment leading to a wire gutter at the side of the load center. The wire gutter may be separately covered. The shutter plate will have the necessary length and width to safely cover the portion of the circuit breaker compartment conveying power and may include a mechanism that allows the shutter assembly to be firmly retained in the breaker compartment of the panelboard. The breakers are preferably equipped with positive retention interlocks providing a hold down mechanism and an interlock which will not allow the breaker to be inserted to, or removed from, the compartment in the ON position. Such interlocks were illustrated previously in Applicant's U.S. patent application Ser. No. 14/449,881 [CRC-0298].

Inserting the circuit breaker in the panelboard forces the shutter plate to slide from the raised, or protective, position into an lowered, or unprotected, position where the stabs extend through openings, i.e. throughholes, in the shutter plate aligned therewith, thereby allowing the female terminals of the circuit breaker to contact, i.e. electrically connect to, the male conductor stabs in the panelboard.

In some implementations, the circuit breaker may have inclined planes on portions of an outer casing of the circuit breaker, for example, on the side walls thereof. As the circuit breaker is inserted in the panelboard, the inclined planes act as a keying mechanism to line up with latches holding the shutter plate in the protective raised position, until the flat sides of the breaker engage with and release the latches allowing the shutter plate to be moved into the lowered unprotected position. When the circuit breaker is removed from the panelboard, the shutter plate is forced upward by a biasing coil spring on the bottom side thereof and the latches, which are separate flat spring mechanisms, move back into the well to latch the shutter plate in the protective position.

In one aspect, the disclosed embodiments are directed to a breaker compartment in a panelboard, and a shutter assembly in the breaker compartment, the shutter assembly disposed over the live conductor contacts and movable in one axis by a circuit breaker insertion in the same axis between a closed position in which the shutter assembly blocks access to the conductors of the panelboard and an open position in which the shutter assembly allows access to the conductors in the panelboard. Inserting a circuit breaker in the panelboard automatically puts the shutter assembly in the open position and removing the circuit breaker from the panelboard automatically puts the shutter assembly in the closed position.

In another aspect, the disclosed embodiments are directed to an electrical panelboard having a bus layout with pin-shaped stabs. Laid over the pin-shaped stabs is a circuit breaker compartment structure in the form of an open-faced box, with the bottom surface of the box, or an interstitial insulation layer, or both, covering all the bus structure but the stabs. The circuit breaker compartment structure provides individual compartments for the breakers and allows the stabs to protrude into the compartments; with each compartment having a shutter assembly including a shutter plate with throughholes for the stabs, a bias spring urging the shutter plate to the closed position, and preferably a latch for holding the shutter plate to the raised protective position wherein access to the stabs is closed off.

In another aspect, the disclosed embodiments are directed to a panel board assembly, including a power bus in a first plane with vertical stabs extending 90-degrees from the power bus in a first axis; a neutral bus in the first plane with vertical stabs extending 90-degrees from the neutral bus in the first axis; the stabs of each of the power bus and the neutral bus being arranged in a respective line; the stabs having a free end being distal from the busses, the free ends having caps of nonconductive material and extending through a nonconductive layer; circuit breaker compartments for receiving circuit breakers inserted along the first axis; the circuit breaker compartments overlaying the nonconductive layer and having the stabs protruding therein; a shutter plate in each of the circuit breaker compartments, each shutter plate having a throughhole for receiving a stab of the power bus and a throughhole for receiving a stab of the neutral bus; and the shutter plate having a raised position overlaying all pin-shaped stabs in a circuit breaker compartment and having a lowered position allowing the stabs of the circuit breaker compartment to protrude therethrough.

BRIEF DESCRIPTION OF THE DRAWINGS

The foregoing and other advantages of the disclosed embodiments will become apparent upon reading the following detailed description and upon reference to the exemplary explanatory drawings offered to illustrate the invention according to one or more embodiments disclosed herein, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1A:
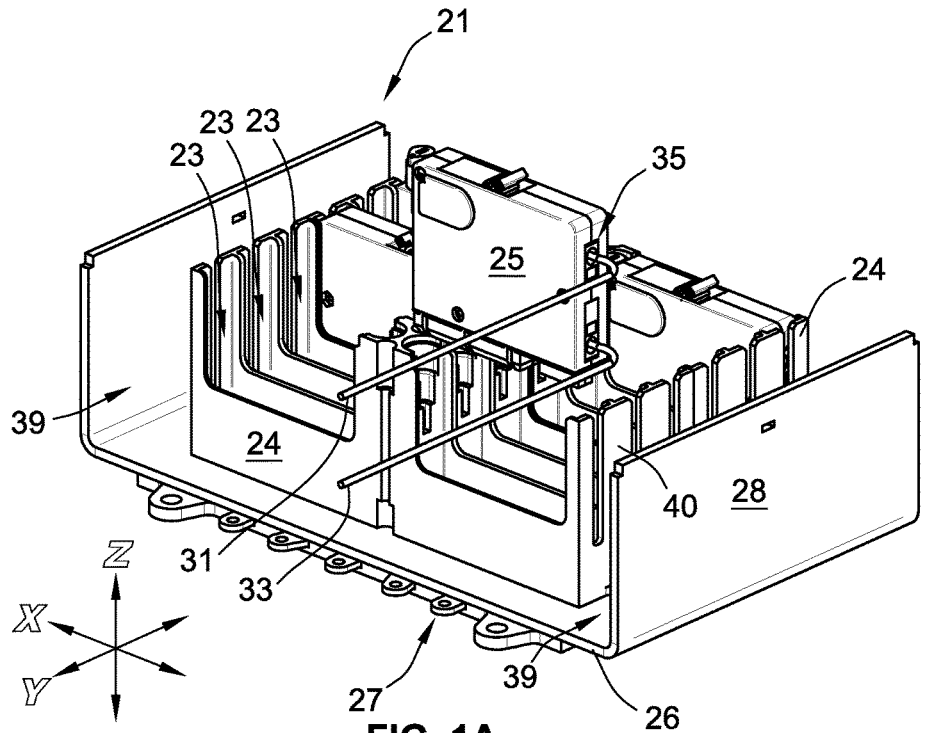
FIGS. 1A and 1B show top right perspective views of the circuit breaker compartment portions of an exemplary panelboard according to one or more embodiments disclosed herein, with descriptive axes of direction indicated thereon.
Figure 1B:
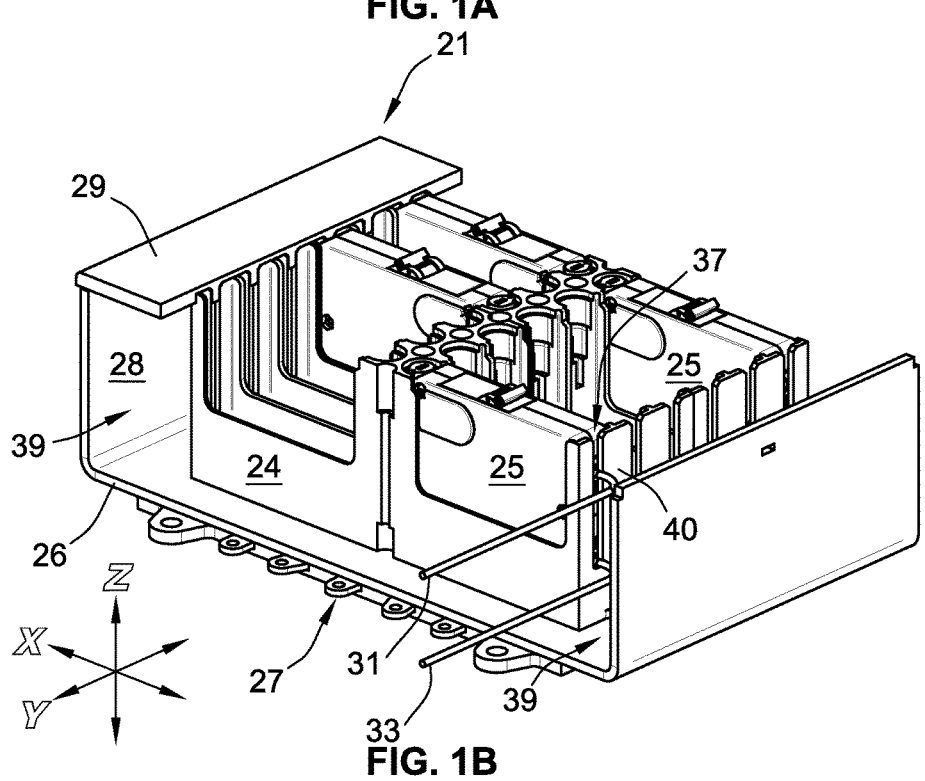

Referring now to FIGS. 1A and 1B, a load center 21 is shown according to the disclosed embodiments. It will be appreciated that various other covering and enclosing structure may form a finished version of the load center, including for example a removable wiring gutter cover 29 shown in FIG. 1B The load center 21 provides a plurality of circuit breaker compartments, collectively 23, in which circuit breakers, collectively 25, may be mounted in order to connect to conductors, i.e. busses, collectively 27, in the load center 21. As shown, the circuit breaker compartments 23 can be formed in a one-piece unitary assembly 24 of nonconductive material in an overall box-shape having one open side. The one-piece unitary assembly 24 is fastened atop an insulative plate structure 26 having side walls 28 spaced apart from the one-piece unitary assembly 24 and forming wiring gutters 39.

FIG. 1A illustrates the required prewiring of the circuit breaker 25 prior to insertion in the panel board 21, with branch load line 31 and neutral line 33 being inserted and captured in the interior of the circuit breaker case and exiting through an end panel 35 of the circuit breaker 25. FIG. 1B illustrates the inserted circuit breaker 25 in its compartment 23 with branch load and neutral lines 31, 33 respectively, exiting through a slot 37 in the end wall 40 of the compartment which communicates with a wiring gutter 39.

Figure 2:
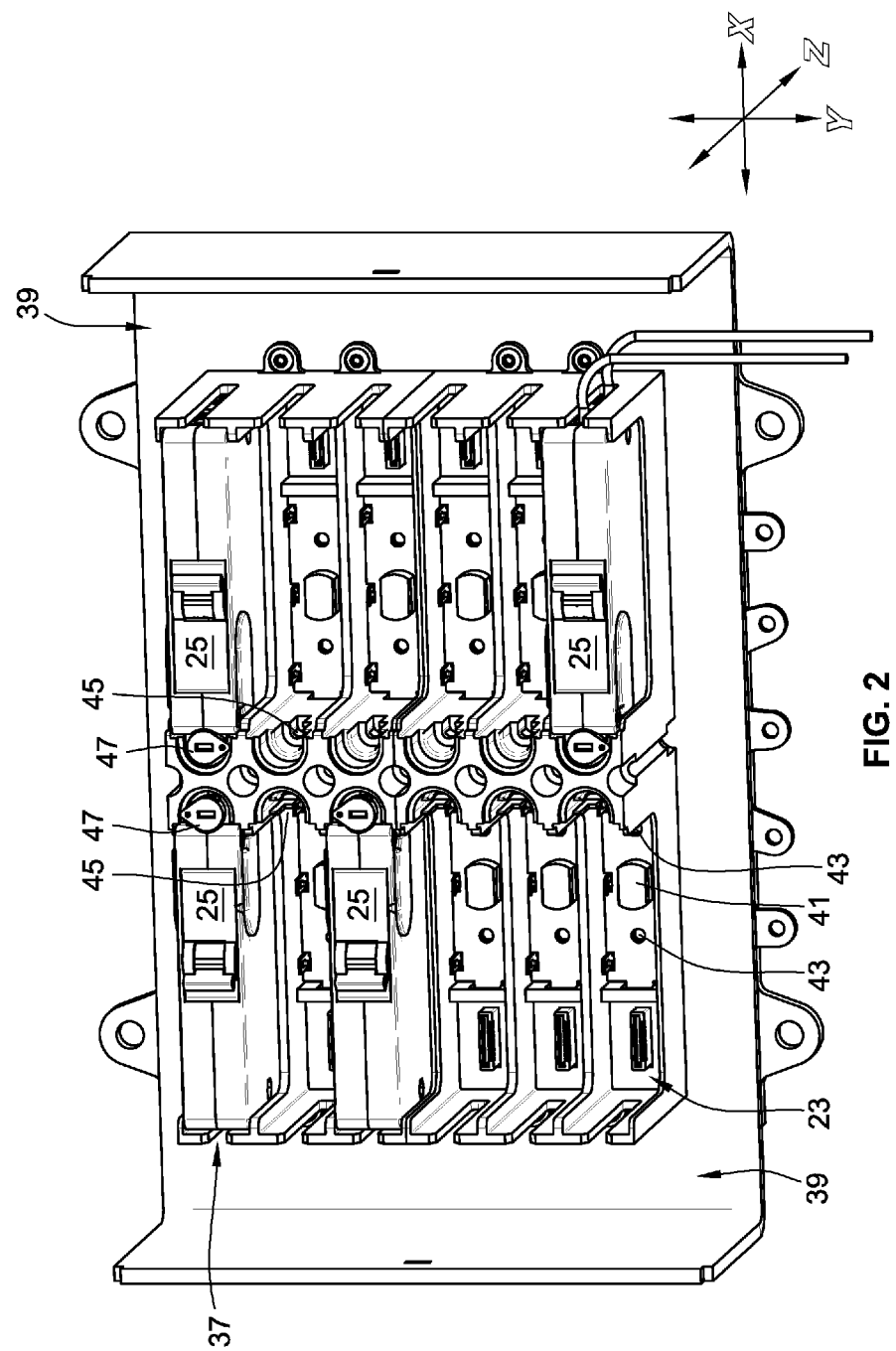
FIG. 2 shows a top perspective view of the well portions with exemplary breakers in four compartments and shutter assemblies in the bottom of the other compartments.

FIG. 2 shows a top perspective view of the circuit breaker compartment portions with exemplary breakers 25 in four respective circuit breaker compartments 23 and nonconductive shutter plates, collectively 41, in the bottom of the other circuit breaker compartments. Three of the circuit breakers 25 are shown without branch wiring for simplicity. Visible in the two through-holes of each of the shutter plates 41 are the nonconductive caps 43 covering the bus stabs. Also visible in FIG. 2 are the receptacles 45 for the positive retention interlocks 47 of the circuit breakers 25.

Figure 3A:
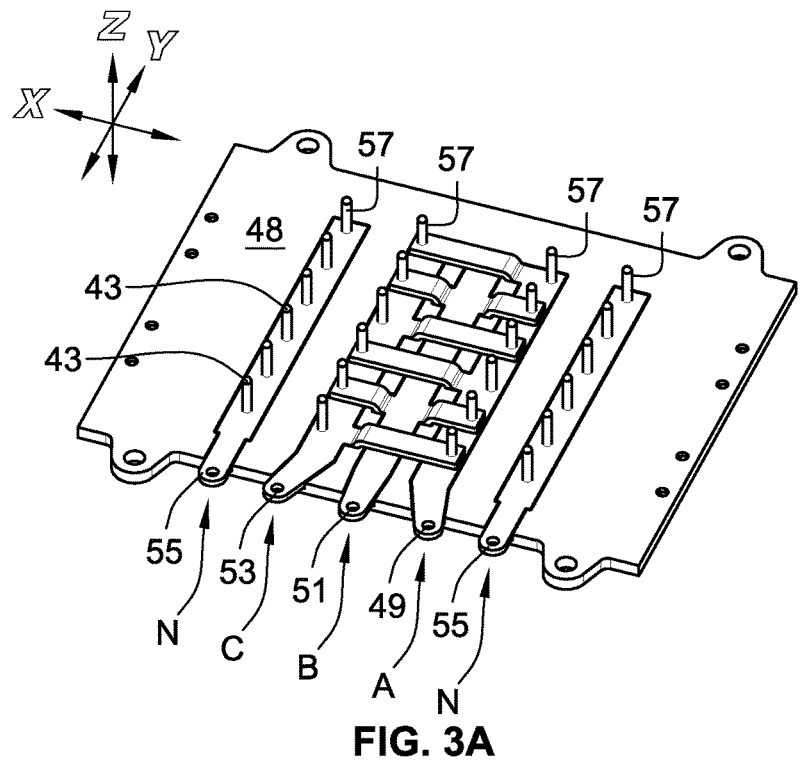
FIGS. 3A and 3B show an exemplary uncovered and partially covered bus layout, respectively, for the load center.
Figure 3B:
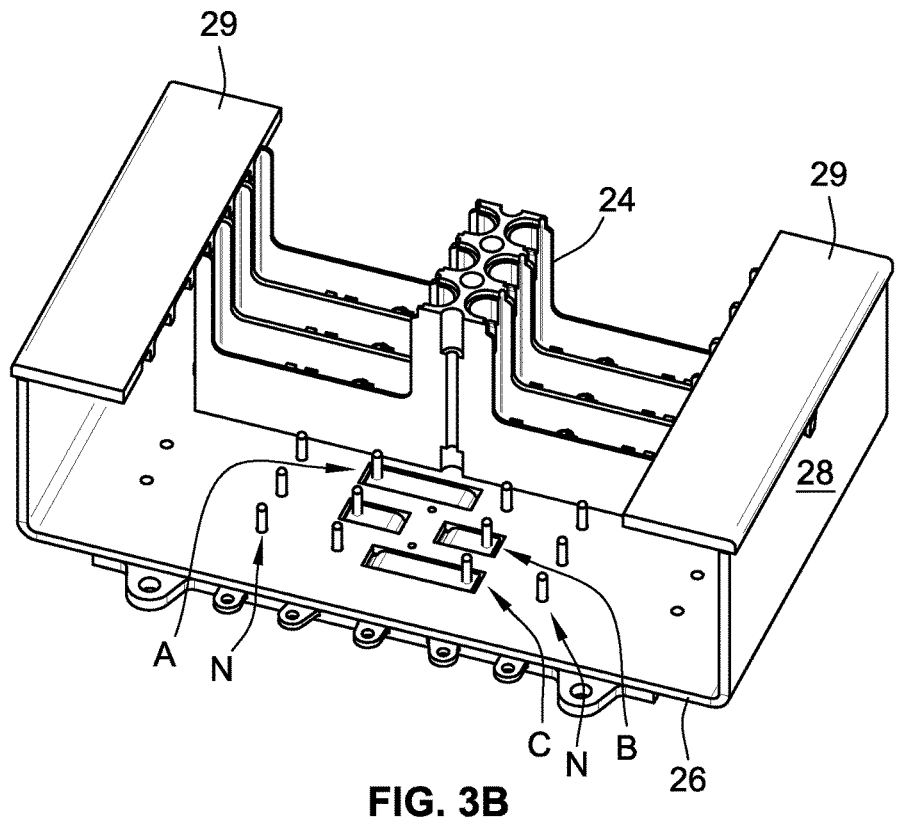

As seen in FIG. 3A, the busses 27 of the load center are affixed to a nonconductive backplane 48 extending in the X-Y plane. The exemplary bus system is a three phase power bus system having an A phase 49, a B phase 51 a C phase 53, and two neutral busses, collectively 55, to accommodate a two row load center as better seen in FIG. 3B. Each bus has a Y axis line of pin-shaped stabs, collectively 57, extending in the Z axis, i.e. vertically. Each stab 57 is capped with a nonconductive cap 43 at its free end, as mentioned above. Each bus 27 may extend beyond the backplane 48 for connection to incoming line power. It will be appreciated that various arrangements of the bus structure may be possible dependent upon factors such as the phases of power to be delivered through the load center, etc. The busses are then preferably covered with a nonconductive material, e.g. epoxy, or the insulative plate 26, which has been perforated with holes to allow the stabs 57 to protrude therethrough into the circuit breaker compartments. It is envisioned that the insulative plate 26 and unitary circuit breaker compartment structure 24 could be formed as a single unit in some aspects of the invention. The stabs 57 within the circuit breaker compartments are then covered with the shutter plates 41, such as seen in FIG. 2, such that the free ends of the stabs, preferably including the nonconductive caps 43, rest below the upper surface of the shutter plates 41 (FIG. 2) and within throughholes 58 (FIG. 4) of the shutter plates so as to allow access to the stabs when the shutter plates are depressed by circuit breaker insertion.

Figure 4:
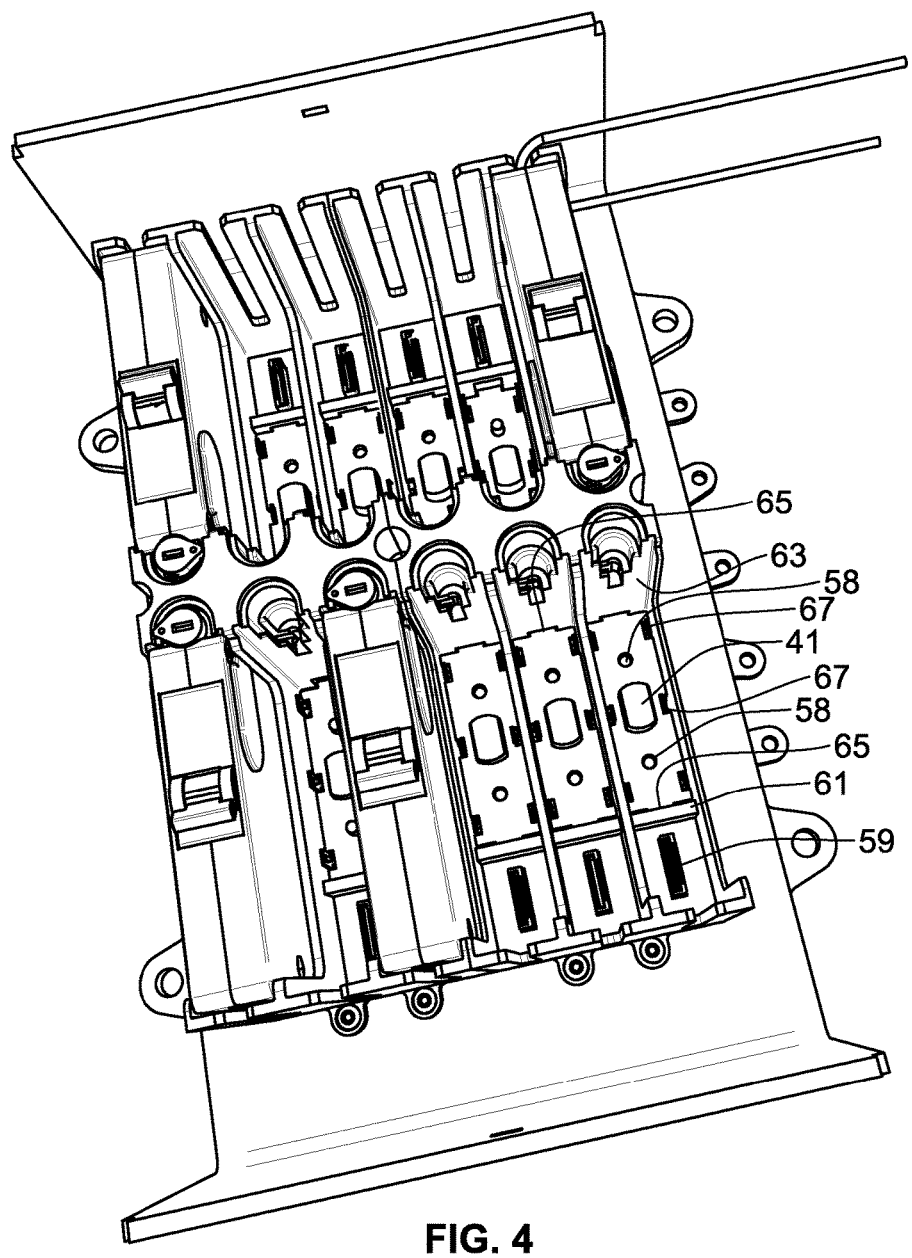
FIG. 4 is a top perspective view similar to FIG. 2 showing exemplary shutter assemblies in the bottom of a circuit breaker compartment structure.

As seen in the embodiment of FIG. 4, the shutter plate 41 need not cover the entire bottom of the circuit breaker compartment, but only such portion as is necessary to protect the load power and neutral stabs. For instance, the bottom of each circuit breaker compartment may also contain a communications port 59 by which appropriately equipped circuit breakers may communicate various information, or receive DC power, or both. As shown, the shutter plates 41 may have extension tabs 65 which are accommodated in races within cross bars 61 and front walls 63 in the well structure to provide added stability. Also seen are the tops of the latches 67 which retain the shutter plates 41 in the raised and protected position until released by insertion of a corresponding circuit breaker, as further explained below.

Figure 5A:
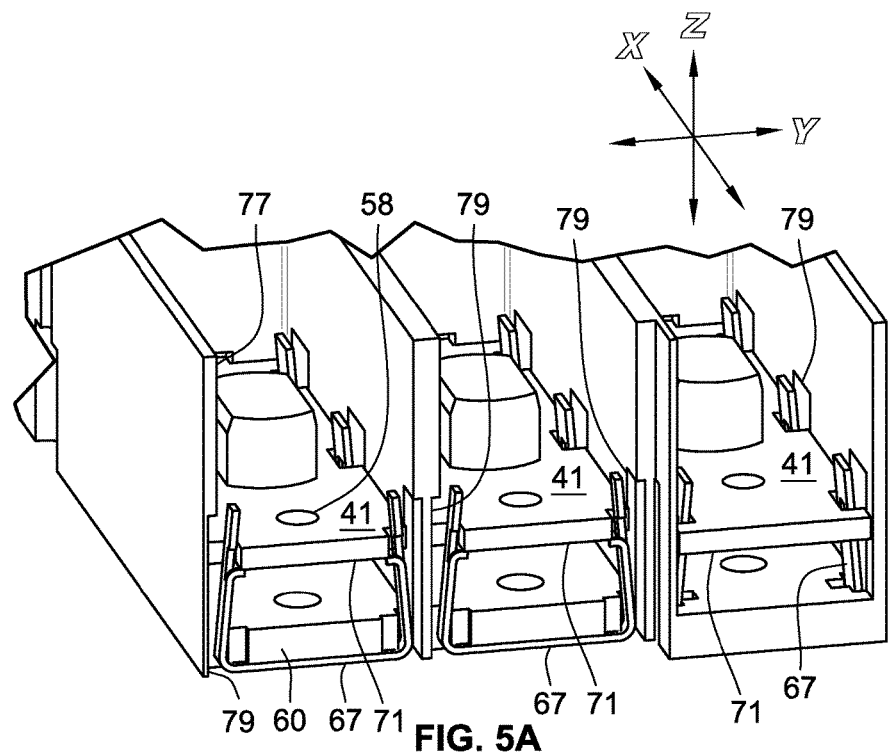
FIGS. 5A and 5B show details in perspective end view of circuit breaker compartments, two with partial cutaway; with shutter assemblies therein.
Figure 5B:
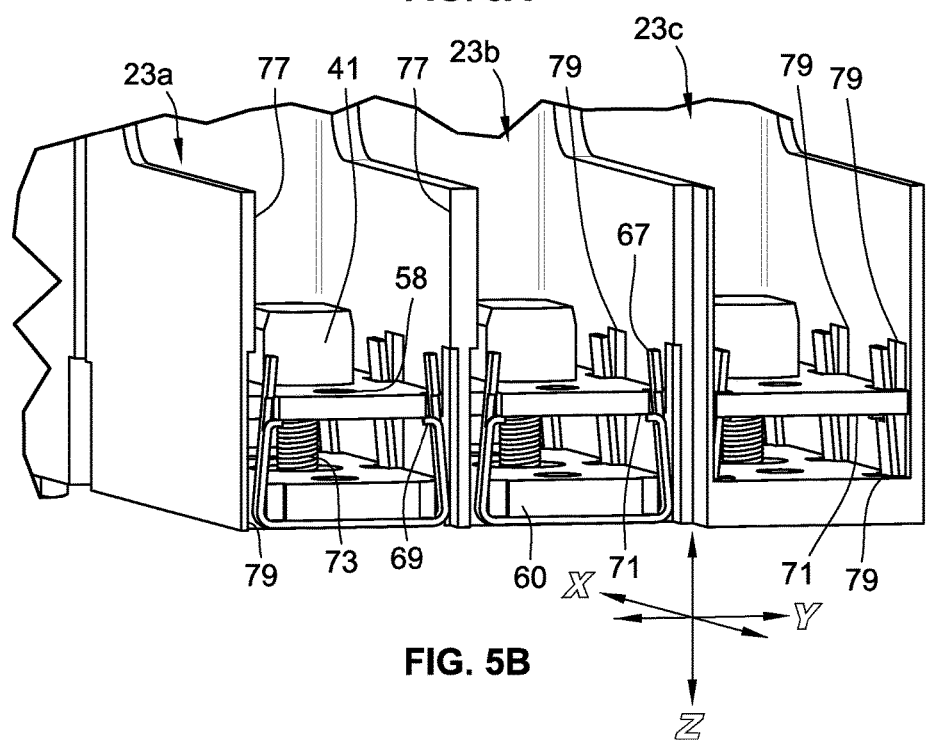

FIGS. 5A and 5B are partially cutaway compartment structures to show further details of the shutter assemblies with a shutter plate, collectively 41, within the structure of the circuit breaker compartments 23, and supported in the raised and protected position by latches 67 engaging the shutter plates 41. The compartment structures are not attached to the busses in these views so the stabs 43 are not seen. The latches 67 are in the form of U-shaped flat springs with the curve of the U held in place by a section of the bottom plate 60 of the nonconductive one-piece unitary assembly 24. The upwardly extending arms of the U's have inward facing tabs 69 upon which rest the bottom surface 71 of the nonconductive shutter plate 41. While shown as three U-shaped springs in each compartment 23, it will be appreciated that the number and design of the latch elements may vary.

Figure 6:
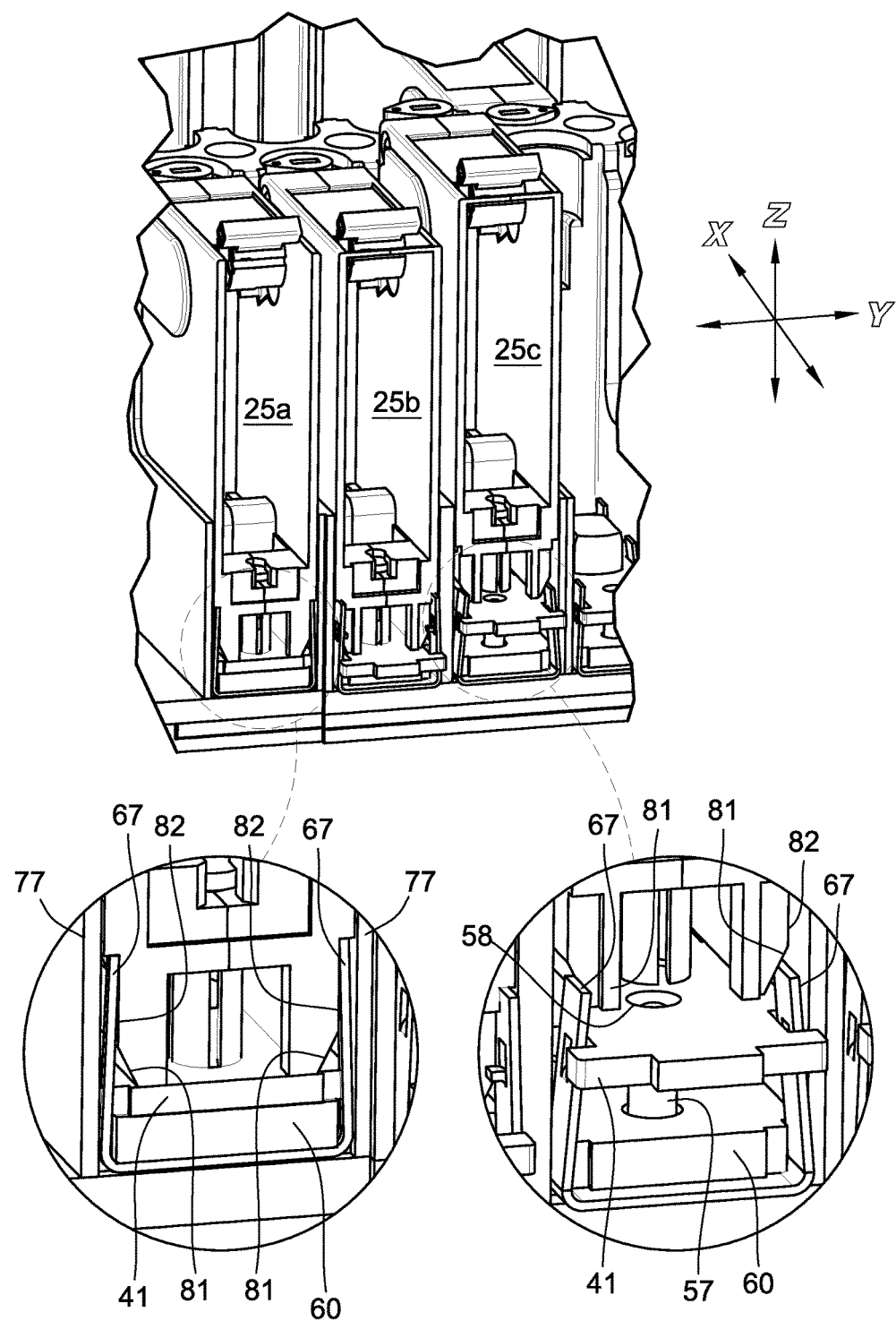
FIG. 6 shows medial sectional perspectives through the Y-Z plane of three exemplary circuit breakers, breaker compartments and bus structure in different stages of engagement with the shutter assemblies.
Figure 7:
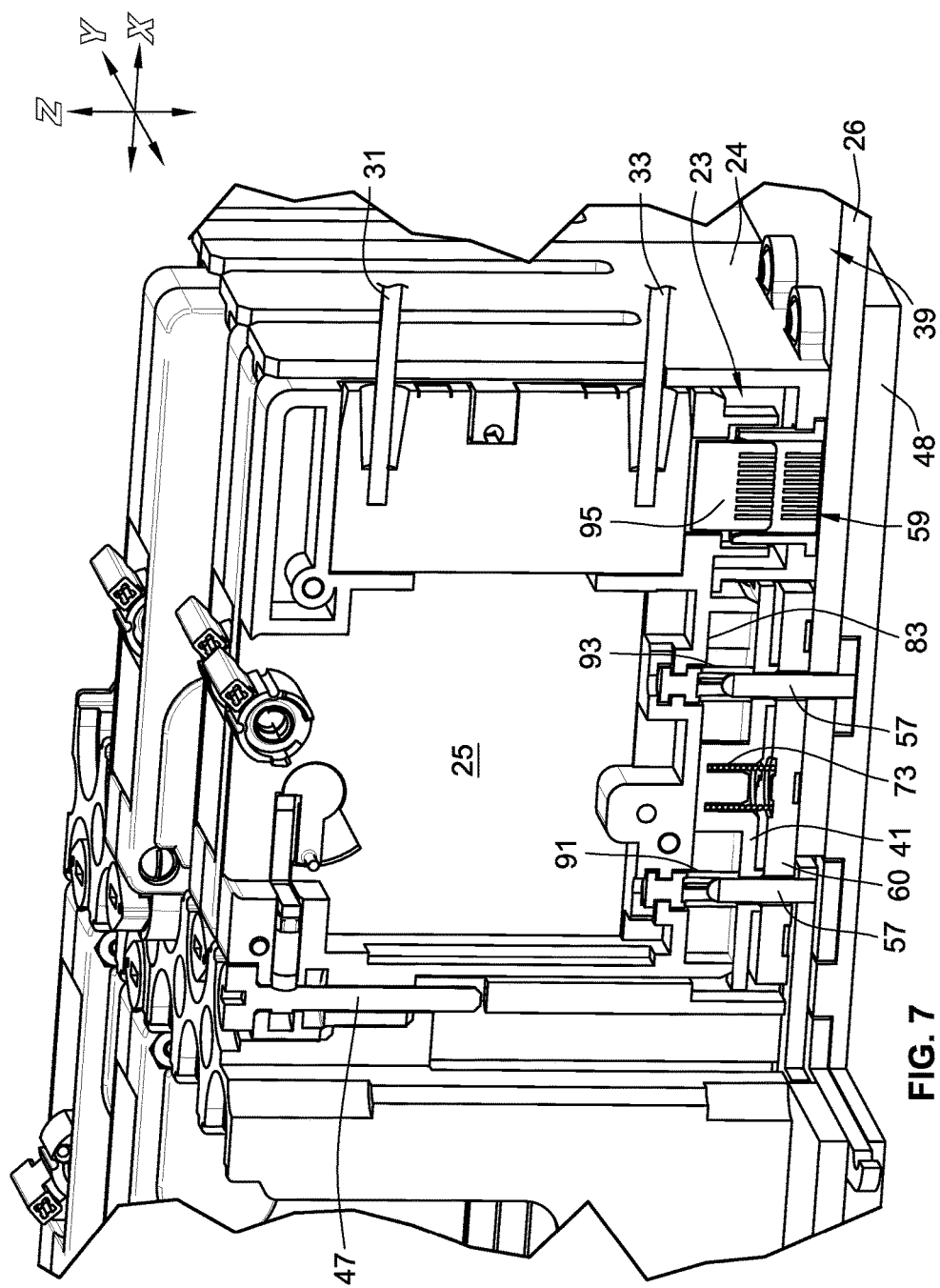
FIG. 7 shows a medial sectional perspective through the X-Z plane of an exemplary shutter assembly, a circuit breaker in engagement with the bus structure; a deep well circuit breaker compartment, and a wiring gutter.

As seen in FIG. 5B, a coil spring 73 is placed between the bottom surface 71 of the shutter plate 41 and the bottom plate 60 of the circuit breaker compartment 23 to bias the shutter plate 41 upwardly in the Z axis towards the raised and protected position in which it is latched. The latches 67 are pushed by shaped elements of the inserted breaker case (FIG. 6) to the side walls 77 of the circuit breaker compartment 23, thereby moving the tabs 69 out from under the lower surface 71 of the shutter plate 41 to unlatch the shutter plate 41 and allow it to move downwardly to the lowered and unprotected position (FIGS. 6-7). The shutter plate 41 may have cut outs 79 providing a space into which the latch arms and tabs 69 can be accommodated when the shutter plate is descending.

Referring also to FIG. 6, cross sections of two circuit breakers 25a, 25b are shown in the fully inserted position while a third 25c is shown in a partially inserted position. The lower edges 81 of each breaker 25 are inclined or beveled in order to gradually force the latches 67 towards side walls 77 until the flat sides 82 of the circuit breakers above the beveled lower edges 81 force the latches fully open allowing the shutter plates to be forced down by the bottom surfaces 83 of the circuit breakers 25.

As seen in FIG. 7 once the circuit breaker 25 is fully inserted with a Z axis motion, the shutter plate 41 is fully depressed in the Z axis to the bottom plate 60 of the circuit breaker compartment structure 24 allowing the line terminal 91 and neutral female terminal 93 inside the bottom surface 83 of the circuit breaker 25 to make electrical contact with the vertical bus stabs 57. Appropriate shaping of the bottom surfaces of the circuit breaker and the top surfaces of the shutter plate, such as best seen in FIG. 7 may be accomplished in the design. As discussed above, the previously attached branch load and neutral wires 31, 33 exit the circuit breaker compartment 23 through slot 37 (FIG. 1B) into the wiring gutter 39. The communication port 59 of the circuit breaker compartment 23 has accepted the corresponding connector 95 on the circuit breaker 25 outside of the shutter plate area. The positive retention interlock 47 has been fastened, securing the circuit breaker in the circuit breaker compartment 23 and allowing it to be placed in the ON position.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

What is claimed is:

1. A panel board assembly, including a power bus in a first plane with vertical stabs extending 90-degrees from the power bus in a first axis; a neutral bus in the first plane with vertical stabs extending 90-degrees from the neutral bus in the first axis; the stabs of each of the power bus and the neutral bus being arranged in a respective line; the stabs having a free end being distal from the busses, the free ends having caps of nonconductive material; circuit breaker compartments for receiving circuit breakers inserted along the first axis; the circuit breaker compartments having the stabs protruding therein; a shutter plate in each of the circuit breaker compartments, each shutter plate being nonconductive and having a throughhole for receiving a stab of the power bus and a throughhole for receiving a stab of the neutral bus; and the shutter plate having a raised position such that a to surface of the shutter plate is above the tops of all stabs in its circuit breaker compartment and having a lowered position allowing the stabs to protrude through the shutter plate.

2. The panel board assembly of claim 1, wherein the stabs are pin-shaped.

3. The panel board assembly of claim 1, further comprising: a layer of nonconductive material covering the busses and allowing the stabs to protrude therethrough.

4. The panel board assembly of claim 3, wherein the layer of nonconductive material is a nonconductive plate with throughholes for the stabs.

5. The panel board assembly of claim 4, wherein the nonconductive plate is a wall of a one-piece unitary assembly of nonconductive material having the circuit breaker compartments formed therein.

6. The panel board assembly of claim 1, further comprising: the shutter plate being part of a shutter assembly having a biasing spring for urging the shutter plate to the raised position.

7. The panel board assembly of claim 6 further having a latch for retaining the shutter plate in the raised position.

8. The panel board assembly of claim 7, wherein the latch includes a U-shaped flat spring with tabs on the arms of the U to engage the shutter plate.

9. The panel board assembly of claim 8, wherein the arms of the U have a first position extending the tabs into contact with the shutter plate and a second position upon contact with a complementary-shaped circuit breaker wherein the tabs are forced towards side walls of circuit breaker compartment, thereby releasing the latch.

10. The panel board assembly of claim 1, further comprising: the circuit breaker compartments each being a well whose sides extend in the Z axis to substantially cover the depth of a respective circuit breaker when inserted into a respective circuit breaker compartment.

11. The panel board assembly of claim 5, further comprising: a wiring gutter in the one-piece unitary assembly.

12. The panel board assembly of claim 11, further comprising: a slot in the circuit breaker compartment on that side of the circuit breaker compartment leading to the wiring gutter.

13. The panel board assembly of claim 1, wherein the panel board is a load center.

14. The panel board assembly of claim 13, wherein the circuit breaker compartments are sized for miniature circuit breakers.

\* \* \* \* \*